Figure 1:
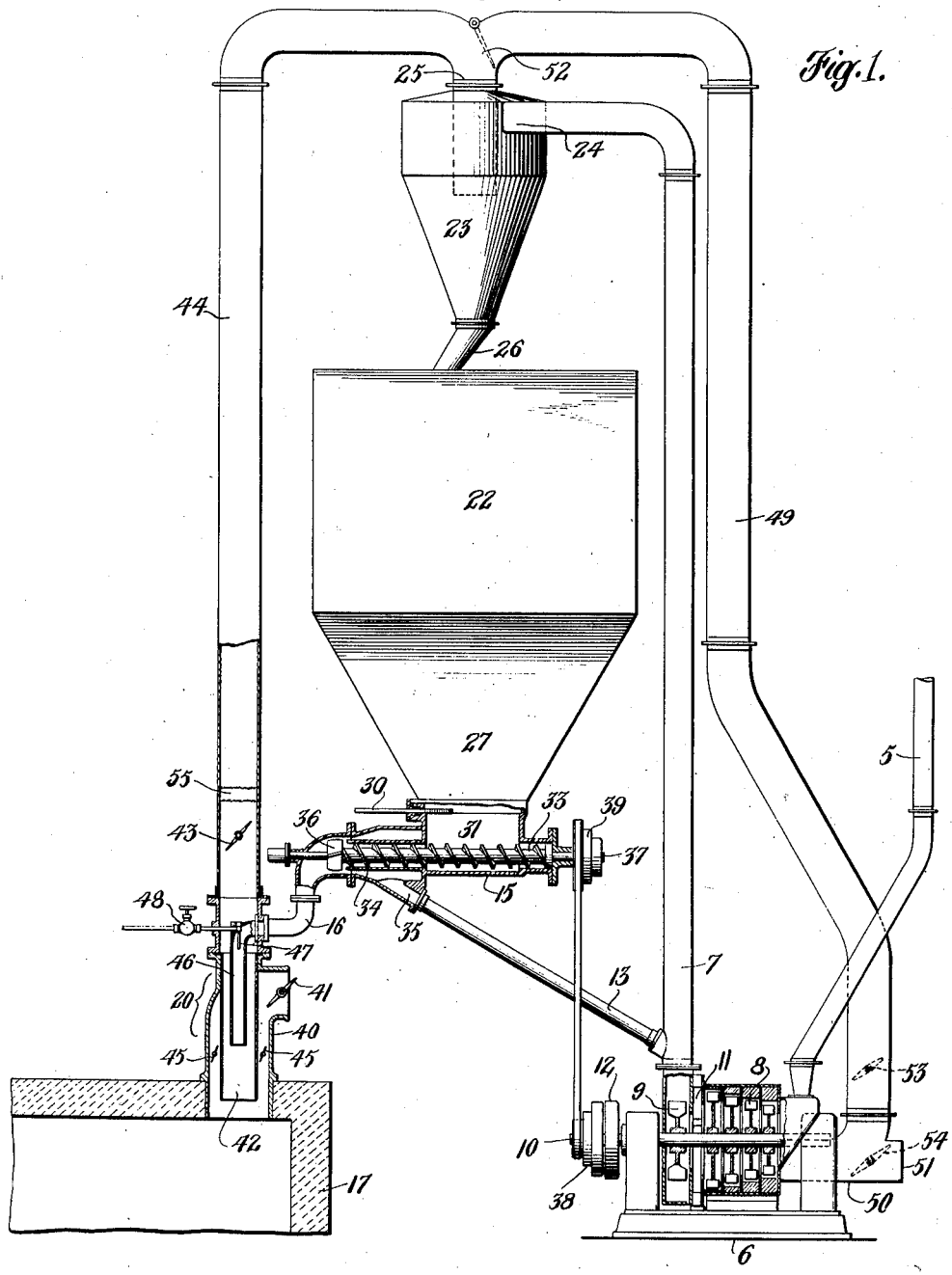

Nov. 17, 1925.  1,562,411

V. Z. CARACRISTI ET AL

PULVERIZED FUEL APPARATUS

Filed Sept. 17, 1921  2 Sheets-Sheet 1

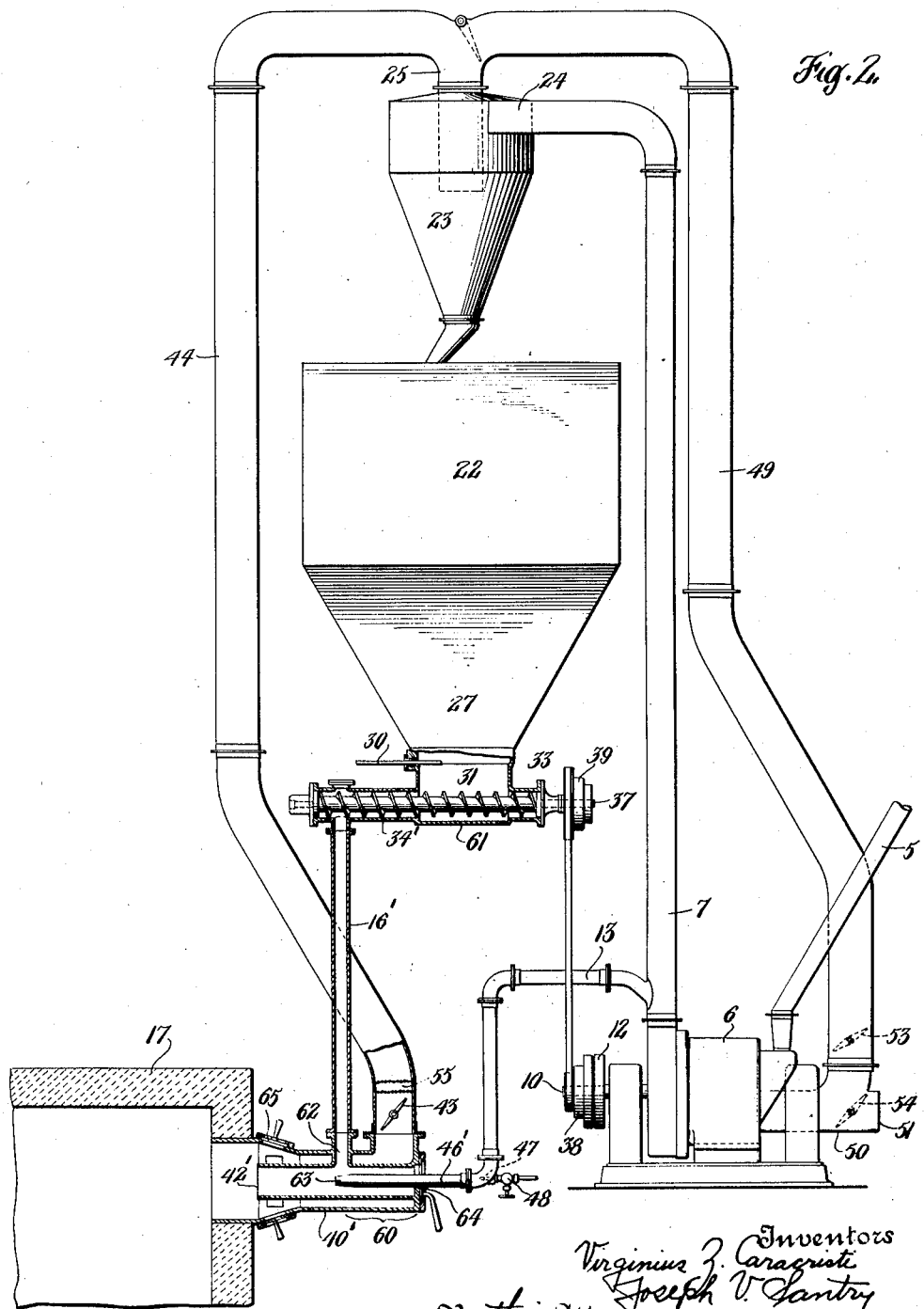

Patented Nov. 17, 1925.

1,562,411

UNITED STATES PATENT OFFICE.

VIRGINIUS Z. CARACRISTI, OF BRONXVILLE, AND JOSEPH V. SANTRY, OF NEW YORK, N. Y., ASSIGNORS TO LOCOMOTIVE PULVERIZED FUEL COMPANY, A CORPORATION OF DELAWARE.

PULVERIZED-FUEL APPARATUS.

Application filed September 17, 1921. Serial No. 501,488.

*To all whom it may concern:*

Be it known that we, VIRGINIUS Z. CARACRISTI and JOSEPH V. SANTRY, both citizens of the United States, respectively residing at Bronxville, in the county of Westchester and State of New York, and at New York city, in the county of New York and State of New York, have invented certain new and useful Improvements in Pulverized-Fuel Apparatus, of which the following is a specification.

Our invention relates to pulverized fuel apparatus, and is more especially concerned with the feeding of pulverized fuel to steam boiler and other furnaces and the like. We aim to provide for prompt and flexible control or regulation of the amount of pulverized fuel fed to the furnace burner (or burners) to meet variations and fluctuations of the demand for fuel from time to time; to provide for similarly appropriate control or regulation of the air supplied for the combustion of the fuel; and to make the control or regulation of pulverized fuel and of air relatively independent of the operation of the pulverizer that serves the furnace. Thus, on the one hand, we can check or even stop the supply of fuel to the furnace awhile without either "backing up" on the pulverizer or checking its operation in any way; or, on the other hand, we can check or even interrupt the supply of fuel to the pulverizer for a time without starving or checking the furnace, even when operating under the heaviest loads. Accordingly, we can pulverize the fuel at a constant rate corresponding to the average load on the furnace with full assurance of always supplying pulverized fuel to its burner means in quantities exactly suited to the momentary demand, however different from the average.

Another advantage of our invention is that it can readily be carried out with a fuel supply system whose component parts are many of them already available commercially.

How these and still other advantages can be secured through our invention will appear from our description hereinafter of the best embodiments of the invention known to us.

In the drawings, Fig. 1 is a side elevation (somewhat diagrammatic) of a convenient system or apparatus for pulverizing, feeding, and storing pulverized fuel for the purposes of our invention.

Fig. 2 is a similar view of a modified system.

In the system shown in Fig. 1, fuel such as suitably crushed soft coal (for example) is supplied through a pipe 5 to a pulverizer 6, which may be of any suitable commercial type. The pulverized fuel is carried off from the pulverizer 6 through a pipe 7, by a current of air under pressure caused by suitable rotary fans or impellers 8, 9 on the pulverizer shaft 10. As here shown, the pulverizer 6 is of the feeder and beater type, in which the fuel is reduced to a fine state of division by the beating action of the fans 8 and by being thrown against the walls of the casing by said fans, and is taken up and carried along by air drawn through the pulverizer fans 8 which is admitted via a chamber 11. The fuel-laden air is then forced out through the pipe 7, under pressure, by the centrifugal fan 9 on the shaft 10. The pulverizer shaft 10 has a drive-pulley 12 for a belt connection to any convenient source of power (not shown), such as a variable or multi-speed electric motor.

A pipe 13 branching off from the pipe 7 conducts a part, at least, of the fuel-laden air (through the casing of a feeder 15, hereinafter described, and a pipe 16) directly to the burner means of the furnace 17,—here illustrated as comprising a single pulverized fuel burner 20, in case the pulverizer is cut out or for any reason does not function for the time being air can enter through chamber 11 and pipe 13. The fuel from the pulverizer 6 not thus supplied to the burner 20—whenever, as is usually the case, there is an excess of fuel from the pulverizer over that supplied the burner 20 as just described—passes on through the pipe 7 and is delivered to a storage reservoir in the form of a bin 22. The fuel thus received by the bin 22 for storage is disengaged from the carrying air by a separator 23. The separator 23 is here shown as of a centrifugal type, comprising a funnel-shaped casing which receives the fuel-laden air through a tangential inlet 24 near its top and discharges the "unloaded" air upward through a central outlet pipe 25 extending downward some distance below the inlet. Being heavier than the air which swirls it, the fuel is thrown outward against the sides of the casing by centrifugal force, and gravitates to the delivery outlet 26 leading into the top of the subjacent bin 22. The bin 22 has a pyramidal hopper bottom 27 with a delivery outlet controlled and regulable by a slide-gate 30. As shown, the bin is of sufficient size to contain a very considerable amount of pulverized fuel, enough to run the furnace some hours, at the very least.

When the slide 30 is open, as shown, fuel discharged through the bin outlet is received by the subjacent feeder 15 (already referred to), and by it, in turn delivered to the burner means 20. The feeder 15 here illustrated is of the type shown and described in the pending application of Virginius Z. Caracristi, Serial No. 407,042, filed August 30th, 1920, assigned to the assignee of this application. Briefly, this feeder 15 comprises a receiving chamber or compartment 31 opening upward directly to the hopper outlet at 30 and a horizontal rotary endless screw conveyor 33 delivering through a fairly close-fitting inner sleeve 34 that projects from the left-hand chamber wall over the intake 35. The pulverized fuel discharged from the sleeve 34 drops into the current from the intake 35 surrounding said sleeve and is taken up and carried along by this current to the burner means 20. A fan or paddle 36 on the revolving conveyor shaft 37 helps to mix the fuel very thoroughly with the air. As shown, the intake 35 is connected to the pipe 13 already mentioned, so that the feeder 15 acts to charge or enrich with fuel from the storage reservoir 22 the above-mentioned current on its way from the pulverizer 6 to the burner means 20 via the pipes 13 and 16. The feeder 15 is regulable to deliver fuel from bin 22 to burner 20 in varying amounts, as from time to time required, by virtue of a variable-speed belt drive comprising step pulleys 38 and 39 on the shafts 10 and 37.

The burner 20 here shown comprises an upright air intake conduit 40 with an elbow connection to an air inlet opening with a butterfly control and regulating valve or damper 41. Extending down through the elbow is another air intake pipe 42 provided with a similar control and regulating valve or damper 43, and connected by piping 44 to the outlet 25 of the separator 23. In the annular space between the conduits 40 and 42 are a plurality of butterfly valves 45 for controlling and regulating the passage of air at various points around the conduit 42. Within the pipe 42 is a nozzle 46, in the form of a downward extension 46 of the fuel-supply pipe 16 (above mentioned) that conveys air laden with fuel by the pulverizer 6 or by the feeder 15, or both. As shown, the nozzle pipe 46 terminates above the lower end of the pipe 42, and the latter above the lower end of the pipe 40. In the nozzle 46 is a downward-directed steam jet 47, controlled by a valve 48, for drawing a current of air through the feeder 15 and its inlet 35 independently of the pulverizer 6 so as to enable the furnace 17 to be supplied with fuel from the bin 22 without operation of the pulverizer,— just as the gate 30, when closed, enables the furnace to be supplied from the pulverizer 6 alone without operation of the feeder 15. For general convenience and to obviate needlessly large sizes of piping 13, 16, it is desirable to charge the carrying air with a great deal more fuel than this air can furnish oxygen to burn completely—hence the intake 40 for admission of outside air, and hence the separator connection 44.

The "unloaded" air leaving the separator 23 through the outlet 25 (at greatly reduced velocity and pressure) will usually retain a certain amount of fuel, which it has hitherto proved difficult and expensive to recover. By the connection 44 from the separator 23 to the combustion air inlet 42 of the burner 20, we can supply this air to the burner as combustion air, in supplementation or in lieu of outside air admission at 41, thus utilizing its residual fuel content to the best advantage. When, on the other hand, it is not desired or practicable to utilize the air from the separator 23 in this manner (as when the pulverizer 6 is run while the burner 20 is not in operation), its fuel content can be "salvaged", by returning and supplying this air to the pulverizer 8 through the piping 49 connected between the separator outlet 25 and the pulverizer intake 50, in lieu or in supplemental of outside air admission at 51 through said intake. For controlling and regulating the distribution of air from the separator 23 as between the burner 20 and the pulverizer 6, a two-way deflector valve or damper 52 is provided at the junction of the pipes 44 and 49 with the separator outlet 25. For controlling and regulating the admission of carrying air to the pulverizer intake 50 as between pipe 49 and opening 51, butterfly valves or dampers 53 and 54 are provided.

For safe-guard against danger from formation of a combustible or explosive mixture in the piping 42, 44 as a result of "flooding" of the separator 23 with fuel, we may mount in the pipe 44 a series of copper wire screens 55, of such fine mesh that the process of combustion cannot propagate itself through them. Such screens 55, therefore, serve as a means of preventing "flare-back" from burner to separator.

The system shown in Fig. 2 is like that just described in many particulars, and similar parts in the two views have therefore been marked with similar reference characters, as a means of avoiding the necessity of merely repetitive description.

The burner 60 here shown differs from the burner 20 of Fig. 1 in the arrangement and connections of its parts, and so does the feeder 61. As to the burner, it will be noted that it is arranged horizontally instead of vertically, and that its fuel nozzle 46' is fed directly by the branch pipe 13, without intervention of the feeder 61. Accordingly, the feeder 61 delivers to the burner 60 through the pipe 16' with the aid merely of gravitation, without admixture or aid of carrying air until both fuel and air are on the point of entering the burner. As shown, the connections of the pipes 40' and 42' are reversed as compared with Fig. 1, the pipe 44 delivering combustion air from the separator 23 to the burner 60 via the pipe 40', while the air inlet damper 64 (corresponding to the damper 41) delivers air to the pipe 42'. The nozzle end 63 is shown as suitably contracted to give a fuel-laden compressed air jet of sufficient velocity to take up and carry the fuel supplied at 62. Outside air for combustion, in addition to that admitted at valve 64, may be admitted through a series of openings in the flare of the pipe 40' that can be controlled and regulated by means of an annular or frustroconical damper or valve 65. An air current or jet of sufficient velocity to take up at 62 the fuel supplied from the bin 22 can be created at 63 independently of the pulverizer 6, by the action of the steam jet 47 in the nozzle pipe 46', so as to enable the burner to be supplied from the bin when the pulverizer is not in operation.

We claim:

1. Pulverized fuel apparatus comprising a pulverizer and means including a pipe for causing an air current to carry off the pulverized fuel therefrom, a separator to which said pipe leads, means for returning separated air from the separator to the pulverizer, burner means, means for supplying said burner means with separated air, a fuel reservoir into which the separator discharges the separated fuel, and a feeder for feeding fuel from said reservoir to said burner.

2. Pulverized fuel apparatus comprising a pulverizer and means including a pipe for causing an air current to carry off the pulverized fuel therefrom; pulverized fuel burner means; a conduit for supplying the burner means with fuel from the fuel laden air leaving the pulverizer; a storage reservoir for pulverized fuel, and a separator to which the first-mentioned pipe leads for disengaging fuel for storage from the fuel-laden air and having an outlet to the reservoir; fuel feeding means between said reservoir and the burner means; means for supplying combustion air to said burner means from said separator; and means for preventing flare-back from burner means to separator.

3. Pulverized fuel apparatus comprising a pulverizer and means including a pipe for causing an air current to carry off the pulverized fuel therefrom; pulverized fuel burner means; a conduit for supplying the burner means with fuel from the fuel laden air leaving the pulverizer; a storage reservoir for pulverized fuel, and a separator to which the first-mentioned pipe leads for disengaging fuel for storage from the fuel-laden air and having an outlet to the reservoir; fuel feeding means between said reservoir and the burner means; and means for supplying combustion air to said burner means from said separator.

4. A pulverized fuel apparatus comprising a pulverizer and means including a pipe for causing an air current to carry off the pulverized fuel therefrom; a storage reservoir for pulverized fuel, and a separator to which said pipe leads for disengaging pulverized fuel for storage from the fuel-laden air and provided with an outlet to the reservoir; pulverized fuel burner means; a pulverized fuel feeder for said burner means receiving fuel from said reservoir; means for delivering carrying air from the aforesaid air current to said feeder; and means for supplying combustion air to said burner means from the aforesaid separator.

5. A pulverized fuel apparatus comprising a pulverizer and means including a pipe for causing an air current to carry off the pulverizer fuel therefrom; a storage reservoir for pulverized fuel; a separator to which said pipe leads for disengaging pulverized fuel for storage from the fuel-laden air and having an outlet to the reservoir; pulverized fuel burner means; a pulverized fuel feeder for said burner means receiving fuel from said reservoir; means for delivering carrying air from the aforesaid air current to said feeder; and means for supplying air to said pulverizer from the aforesaid separator.

6. A pulverized fuel apparatus comprising a pulverizer and means including a pipe for causing an air current to carry off the pulverized fuel therefrom; a storage reservoir for pulverized fuel; a separator to which said pipe leads for disengaging pulverized fuel for storage from the fuel-laden air and provided with an outlet to the reservoir; pulverized fuel burner means; a pulverized fuel feeder regulable to deliver fuel from said reservoir to said burner means in varying amounts, as from time to time required; conduits from the separator to the burner means and to the pulverizer, respectively, together with means for controlling the flow into the conduits.

7. A pulverized fuel apparatus comprising a pulverizer and means including a pipe for causing an air current to carry off the pulverized fuel therefrom; a storage reservoir for pulverized fuel; a separator to which said pipe leads for disengaging pulverized fuel for storage from the fuel-laden air and provided with an outlet to the reservoir; pulverized fuel burner means; a pulverized fuel feeder for said burner means receiving fuel from said reservoir; means for delivering carrying air from the aforesaid air current to said feeder; conduits from the separator to the burner means and to the pulverizer, respectively, together with means for controlling the flow into the conduits.

8. A pulverized fuel system comprising in combination, a pulverizer, a burner, storage means for the pulverized fuel, a feeder taking fuel from the storage means, a conduit from the feeder to the burner, a conduit from the pulverizer to the storage means and a branch pipe leading from the last named conduit to the feeder.

In testimony whereof we have hereunto signed our names.

VIRGINIUS Z. CARACRISTI.
JOSEPH V. SANTRY.